United States Patent
Hassan et al.

(10) Patent No.: US 10,448,265 B2
(45) Date of Patent: Oct. 15, 2019

(54) COLLABORATIVE COMMUNICATIONS

(71) Applicant: Microsoft Technology Licensing, LLC, Redmond, WA (US)

(72) Inventors: Amer Hassan, Kirkland, WA (US); Paul Mitchell, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 156 days.

(21) Appl. No.: 15/289,954

(22) Filed: Oct. 10, 2016

(65) Prior Publication Data

US 2018/0103382 A1 Apr. 12, 2018

(51) Int. Cl.
*H04W 24/02* (2009.01)
*H04L 5/00* (2006.01)
(Continued)

(52) U.S. Cl.
CPC .......... *H04W 24/02* (2013.01); *H04L 1/0002* (2013.01); *H04L 5/006* (2013.01); *H04L 43/16* (2013.01);
(Continued)

(58) Field of Classification Search
CPC ..... H04L 1/0002; H04L 5/006; H04L 1/0041; H04L 47/17; H04L 43/16; H04L 45/00;
(Continued)

(56) References Cited

U.S. PATENT DOCUMENTS 5,136,591 A * 8/1992 Krause .................. H04L 1/24
375/225
6,411,946 B1 6/2002 Chaudhuri
(Continued)

FOREIGN PATENT DOCUMENTS

| WO | 2004095781 A1 | 11/2004 |
|---|---|---|
| WO | 2007064455 A1 | 6/2007 |
| WO | 20090046143 A2 | 4/2009 |

OTHER PUBLICATIONS

Kandris, et al., "Energy efficient and perceived QoS aware video routing over Wireless Multimedia Sensor Networks", In Journal of Ad Hoc Networks, vol. 9, Issue 4, Jun. 2011, pp. 591-607.
(Continued)

*Primary Examiner* — Rownak Islam
(74) *Attorney, Agent, or Firm* — NovoTechIP International PLLC

(57) ABSTRACT

Data traffic routing and/or transmission parameter adaption decisions are made at a sending node by considering error patterns of one or more possible receiving nodes at the bit level. Data traffic routing and/or transmission parameter adaption decisions may be used to preemptively prevent data errors from occurring as data traffic is transmit by a sending node. The error pattern information may include information on numbers of bit errors in a code word or information on relative randomness or burstiness of bit error patterns at the one or more possible receiving nodes. The collaboratively shared error pattern information may be determined and updated over time intervals or upon selected conditions occurring. In one embodiment, a next hop node may be determined using bit error patterns of neighbor nodes. In another embodiment, transmission parameter adaption or channel selection may be determined using bit error patterns.

28 Claims, 8 Drawing Sheets

(51) Int. Cl.
*H04L 12/721* (2013.01)
*H04L 29/06* (2006.01)
*H04W 28/02* (2009.01)
*H04L 12/26* (2006.01)
*H04L 1/00* (2006.01)
*H04L 12/701* (2013.01)
*H04W 40/00* (2009.01)
*H04L 12/64* (2006.01)

(52) U.S. Cl.
CPC .............. *H04L 45/00* (2013.01); *H04L 45/26* (2013.01); *H04L 69/22* (2013.01); *H04W 28/0268* (2013.01); *H04W 40/00* (2013.01); *H04L 1/0041* (2013.01); *H04L 2012/6467* (2013.01); *Y02D 50/10* (2018.01)

(58) Field of Classification Search
CPC . H04L 45/26; H04L 69/22; H04L 2012/6467; H04W 28/0268; H04W 28/02; H04W 24/02; H04W 40/00; Y02D 50/10
USPC ........................................................ 370/391
See application file for complete search history.

(56) References Cited

U.S. PATENT DOCUMENTS

| | | | |
|---|---|---|---|
| 6,647,208 B1 | 11/2003 | Kirby | |
| 6,915,463 B2 | 7/2005 | Vieregge et al. | |
| 7,151,769 B2* | 12/2006 | Stanforth | H04L 45/02 370/351 |
| 7,257,086 B2 | 8/2007 | Brown et al. | |
| 7,487,433 B2 | 2/2009 | Sivakumar et al. | |
| 7,808,952 B2 | 10/2010 | Duan et al. | |
| 8,205,146 B2 | 6/2012 | Brueggen | |
| 8,218,550 B2 | 7/2012 | Axelsson et al. | |
| 8,520,677 B2 | 8/2013 | Zhang et al. | |
| 2003/0091001 A1 | 5/2003 | Watanabe | |
| 2004/0199834 A1* | 10/2004 | Fukae | H04L 1/0002 714/699 |
| 2007/0041345 A1* | 2/2007 | Yarvis | H04L 45/00 370/331 |
| 2007/0091928 A1 | 4/2007 | Wee et al. | |
| 2007/0274268 A1* | 11/2007 | Axelsson | H04L 45/00 370/338 |
| 2009/0252134 A1* | 10/2009 | Schlicht | H04L 1/0015 370/338 |
| 2011/0085439 A1* | 4/2011 | Chandrachood | H04L 12/2876 370/216 |
| 2011/0164527 A1 | 7/2011 | Mishra et al. | |

OTHER PUBLICATIONS

Moon, et al., "Rate-Adaptive Snoop: A TCP Enhancement Scheme over Rate-Controlled Lossy Links", In Journal of IEEE/ACM Transactions on Networking, vol. 14, Issue 3, Jun. 2006, pp. 603-615.

Killian, et al., "Online routing fault detection for reconfigurable NoC", In Proceedings of International Conference on Field Programmable Logic and Applications, Aug. 31, 2010, pp. 183-186.

"International Search Report and Written Opinion Issued in PCT Application No. PCT/US2017/054810", dated Mar. 13, 2018, 20 Pages.

"Invitation to Pay Additional Fees Issued in PCT Application No. PCT/US2017/054810", dated Jan. 19, 2018, 15 Pages.

\* cited by examiner

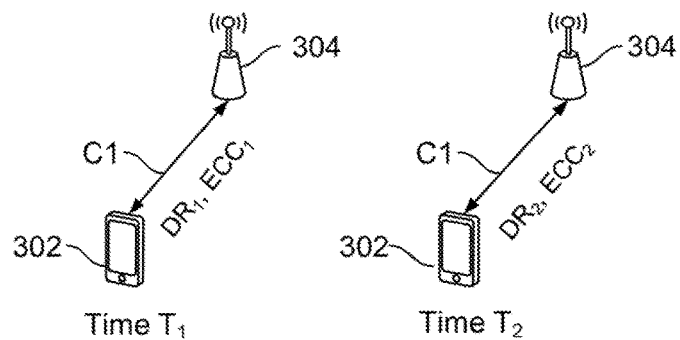
FIG. 3B
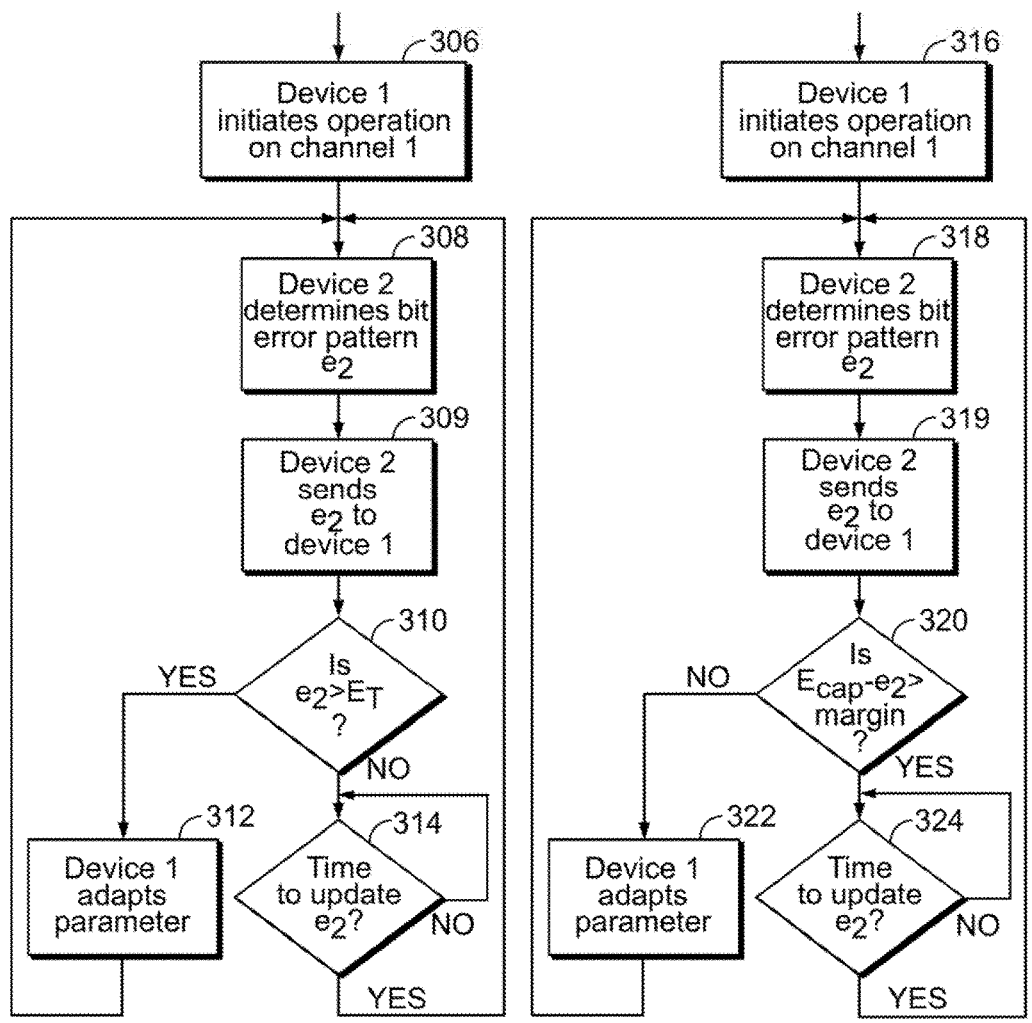
FIG. 3C        FIG. 3D

COLLABORATIVE COMMUNICATIONS

BACKGROUND

A communication network may include nodes or devices that have access to information determined and collected at the nodes or devices during operation of the communication network. In some cases, that information may have use in improving performance of the nodes or devices in the communication network, or in improving the performance of the communication network as a whole. Improving on node or network performance translates to a higher quality of service for applications such as media when using the network.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

The embodiments of the disclosure include systems, devices, and methods that provide collaborative sharing of bit error pattern information between nodes in a network to allow more efficient device and network operation. The shared bit error pattern information may be utilized at the nodes for data traffic routing or data transmission parameter adaption. For example, the bit error pattern information may be utilized by a node in determinations of how to route network data traffic to one or more other nodes of a network. In another example, the bit error pattern information may be utilized in determining transmission parameter adaption for a channel used by a sending node, or utilized in determinations as to which of a plurality of channels may be used by a sending node. The bit error pattern is readily available (or can be easily computed) from existing receivers, which implies no modification to receiver hardware is needed.

The embodiments provide solutions that allow more efficient data traffic routing and/or transmission parameter adaption decisions to be made at a sending node by considering bit error patterns of one or more possible receiving nodes at the bit level. Use of the embodiments for making data traffic routing and/or transmission parameter adaption decisions may also preemptively prevent data errors or data packet errors from occurring as data traffic is transmit by a sending node. The bit error patterns may include information on numbers of bit errors in a code word, measurements of relative randomness to burstiness of bit errors, measurements of randomness of bit errors, or measurements of burstiness of bit errors at the one or more possible receiving nodes. The collaboratively shared bit error pattern information may be determined and updated over time intervals or upon selected conditions occurring to allow data traffic routing and/or transmission parameter adaption to be performed dynamically.

In an implementation, the bit error pattern information may be utilized in making routing determinations at nodes that comprise routers in a network. Bit error pattern information associated with data traffic may be determined at each of one or more nodes of the network. The one or more nodes may then collaboratively distribute and share the bit error pattern information among the one or more nodes. Each of the one or more nodes may then utilize the shared bit error pattern information in making routing decisions when routing data traffic to neighboring nodes as next hop nodes in the network. In another implementation, each of the one or more nodes may also collaboratively distribute and share other information associated with the nodes, such as node error correction capability, among the one or more nodes and combine that other information with bit error pattern information in making decisions. For example, a node routing data traffic may monitor a bit error pattern shared from a selected node currently being used as the next hop node for data packets of the data traffic. When the error pattern of the selected node approaches a threshold associated with the error correction capability of the selected node, the node routing the data traffic may make a determination to preemptively prevent packet errors from occurring by routing the data traffic to another node different from the selected node. The other node may then be used as the next hop node by the node routing the data traffic.

In another implementation, error pattern information may be collaboratively utilized in making transmission parameter adaption decisions when sending on one or more channels in a network. Bit error pattern information associated with each of the one or more channels of the network may be determined at nodes comprising devices receiving on each of the one or more channels. The receiving devices may then collaboratively distribute the error pattern information associated with the one or more channels to devices transmitting on the one or more channels. In an example implementation, a first device receiving on one or more channels may send error pattern information associated with the one or more channels to a second device transmitting on the one or more channels. The second device may then utilize the bit error pattern information in making transmission parameter adaption decisions when transmitting on the one or more channels, or when initiating transmission on the one or more channels. The transmission parameter adaption may include setting data rate, setting error correction capability, or changing transmissions to a different channel. In another example implementation, a bit error pattern may be determined by a first device, where the error pattern is associated with data transmissions received by the first device on a selected channel. The bit error pattern may be given as a number of errors occurring and corrected on the selected channel. The first device may send a bit error correcting capability of the first device and the bit error pattern to a second device that is transmitting data to the first device on the selected channel. As transmissions occur, the first device may send updated error patterns and the second device may compare the updated bit error patterns to the bit error correction capability of the first device. When the bit error pattern approaches the error correction capability of the first device, a determination may be made to reduce the data rate or increase the error correction coding used by the second device on the selected channel to preemptively prevent bit errors from occurring. Alternately, the transmission parameter adaption by the second device may include changing to transmit on another channel instead of the selected channel.

In another example implementation, a first device may utilize bit error pattern information received from other devices operating in a network in order to adapt its transmission parameters prior to using a channel of the network. For example, if a first mobile device is communicating with a first access point of a network and is switching to a channel of a second access point in the network, the first device may adapt its data rate or error correction coding according to error pattern information received from a second mobile device that has previously operated on the channel of the second access point. The error pattern information sent from the second to the first device may have been sent to the second device from the second access point.

BRIEF DESCRIPTION OF THE DRAWINGS

FIG. 3B is a diagram illustrating example devices operating in a network;

FIGS. 3C and 3D are flow diagrams illustrating operations performed by the example devices of FIGS. 3A and 3B;

DETAILED DESCRIPTION

Figure 1A:
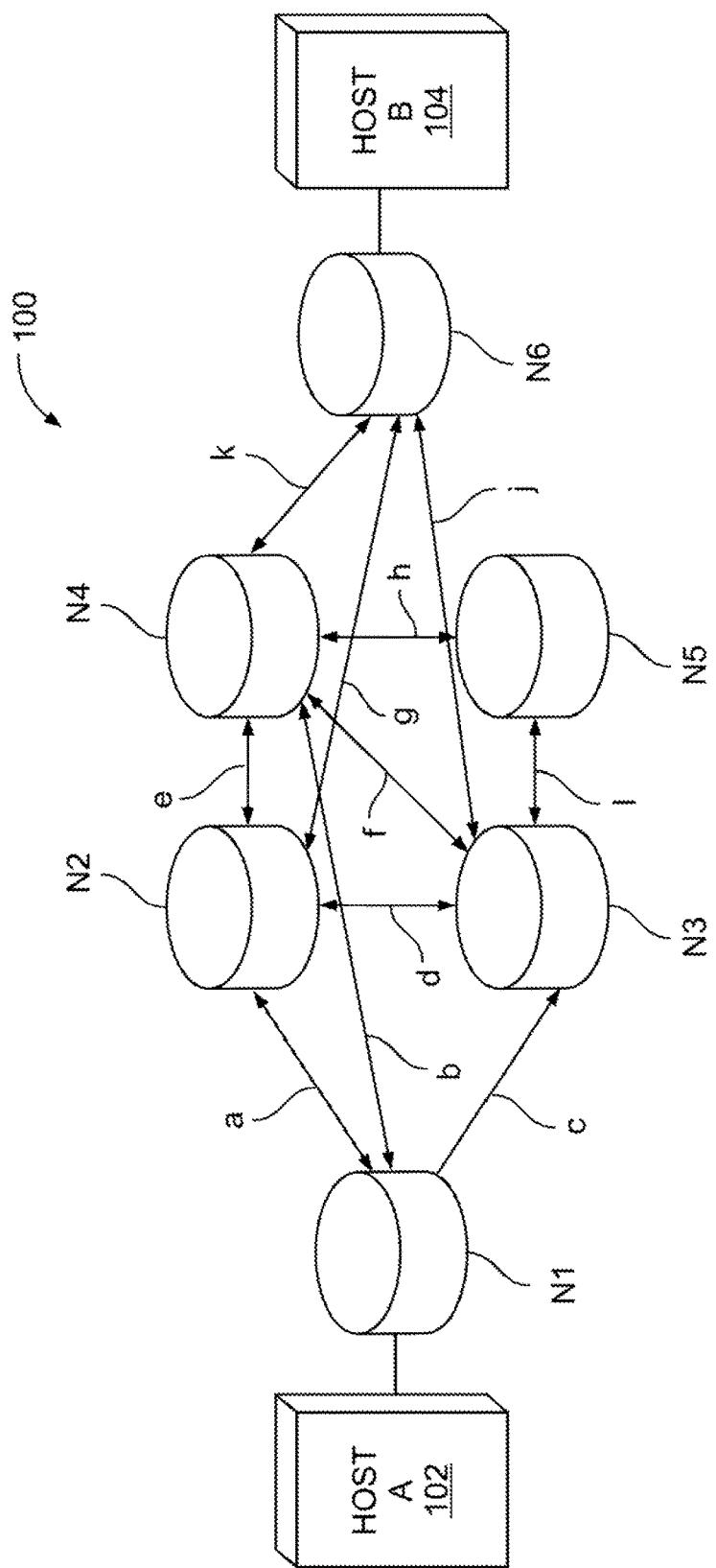
FIG. 1A is a simplified diagram illustrating an example network into which an embodiment of the disclosure may be implemented.

The system, devices, and methods will now be described by use of example embodiments. The example embodiments are presented in this disclosure for illustrative purposes, and not intended to be restrictive or limiting on the scope of the disclosure or the claims presented herein.

The disclosed embodiments provide a technical advantage over conventional communications networks through the use of various types of bit error pattern information for making data traffic routing or data traffic parameter adaption decisions. The error pattern information used in the embodiments allows more refined data traffic decisions than may be made in conventional networks that rely on measurements based on a packet error rate (PER). In the embodiments, data traffic decisions may be made at the bit level rather than the packet level. The bit error pattern information of the embodiments may include information on numbers of bit errors and location of bit errors in a code word, including information on burstiness of a bit error pattern, information on randomness of bit error patterns, or information on relative randomness to burstiness of bit errors. The bit error pattern information may be determined at a receiving node in a network, and then be collaboratively shared among nodes in the network and utilized in data traffic decisions by a sending node.

Conventional communication networks typically use packet error rate (PER) information for data traffic routing and transmission parameter adaption decisions. Typically, PER associated with individual nodes in a network is used when making decisions concerning data traffic within the network. For example, nodes implemented to perform routing decisions by determining next hop nodes for data packets that the nodes are forwarding onward use PER information for the routing decisions. A network having nodes implemented as access points (APs) communicating with wireless devices uses PER information about individual channels, and the receiving nodes on the individual channels, for determining data rate adaption or error correction coding on the channels. PER may also be used in determining which channels to transmit on in a network.

However, PER indicates only a number of packets that each contained at least a certain number of erroneous bits. The PER information is only an indication of the number of packet errors that have already occurred. The PER information lacks certain more detailed bit level error information about what bit error patterns looked like in the erroneous packets. Use of PER information also does not indicate what bit error patterns looked like in non-erroneous packets before any packet errors occurred. For example, bit errors may be occurring in certain patterns that are not be detected/shown by the PER. The PER is not available prior to the packet errors occurring and can only be used in decisions for routing or rate adaption after the fact that the packet level errors have occurred. In contrast, implementations of the embodiments allow a more optimal solution as compared to conventional networks. Bit error pattern information that may reflect the quality level of a receiving node or channel used in the embodiments is available and used for decisions prior to packet errors being indicated by the PER. The bit error pattern information may therefore be utilized prior to packet errors occurring in a preemptory manner. The bit error pattern information is at a more detailed level than PER information and may be utilized in making more refined and efficient data traffic decisions. For example, the bit error pattern information may include information on numbers of bit errors in a code word, measurements of relative randomness to burstiness of bit errors, measurements of randomness of bit errors, or, measurements of burstiness of bit errors. This bit error pattern information is not available from PER and may be utilized for advantage in various use cases, such as when determining a next hop node when routing data packets in a network, when determining transmission parameters used for sending data traffic to a receiving node in a network, or when determining data channels on which to send data traffic in a network.

FIG. 1A is a simplified diagram illustrating an example network 100 according to an implementation of the embodiments. FIG. 1A shows host A 102 communicating with host B 104 through a network that includes nodes N1-N6. In an example implementation, host A 102 and host B 104 may comprise computing devices such as laptops or mobile devices that each includes a client application for communicating with clients on other devices throughout network 100. For example, the client may be a video/audio conferencing application by which a user of host A 102 conducts a conference with a user of host B 104. Nodes N1-N6 may comprise any type of routers or servers that are interconnected by channels a-j and that carry any type of data traffic within network 100. For example, channels a-j may carry internet data traffic comprising packet data. Channels a-j may be implemented as any type of channels that carry data traffic in the network 100 such as channels over landline cables, wireless channels, or channels over optical cables, etc. Although six nodes are shown, network 100 may comprise any number of nodes.

In one example routing scenario, collaborative communications according to the embodiments may be implemented in a network comprised of nodes such as Nodes N1-N6 of FIG. 1. N1 and N6 may comprise a source and destination node for data traffic flow between Host A 102 and Host B 104. Data traffic between nodes N1 and N2 may be routed on various routes comprising nodes N2-N5 as long as the route follows the interconnections between the nodes implemented on channels a-j. For example, data traffic from node N1 to node N6 may be routed from node N1 to node N2 using channel a, and then from node N2 to node N6 using channel g. In another example, data traffic from node N1 to node N6 may be routed from node N1 to node N4 using channel b, and then from node N4 to node N6 using channel k. A node to which a routing node may send data traffic may be known as a neighbor node. For example, node N2, node N3, and node N4 are neighbor nodes of node N1, and, node N1, node N2, node N4, node N5, and node N6 are neighbor nodes of node N3.

Figure 1B:
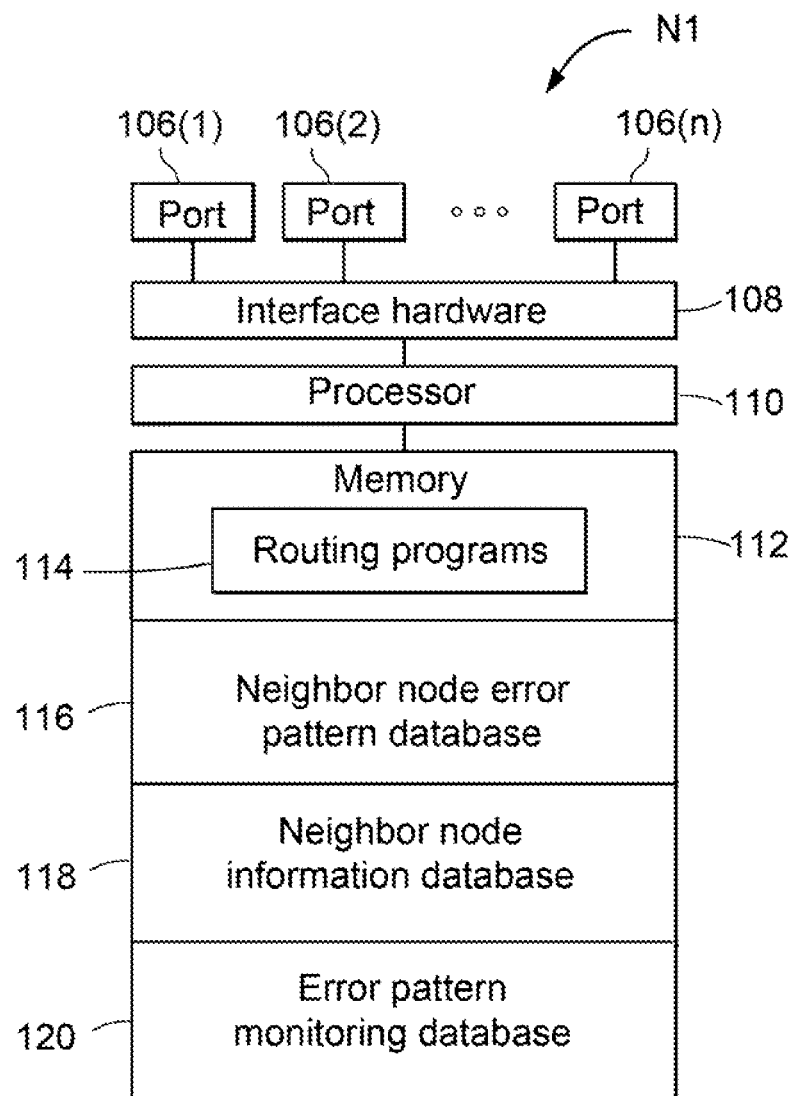
FIG. 1B is a simplified block diagram illustrating portions of an example network node.

FIG. 1B is a simplified block diagram illustrating portions of example node N. In an example implementation, node N1 may be implemented as node N1 of network 100. Nodes N2-N6 of FIG. 1A may also be implemented similarly to FIG. 1B. Node N1 includes ports 106(1)-106(n), interface hardware 108, processor 110, and memory 112. Memory 112 includes routing programs 114, neighbor node error pattern database 116, neighbor node information database 118, and error pattern monitoring database 120. Data packets may be received by node N1 at ports 106(1)-106(n), processed by interface hardware 108 and processor 110, and then forwarded on to other nodes in network 100 from an appropriate port of port 106(1)-106(n) based on a routing decision.

In an implementation, Node N1 may be configured to use process switching and fast switching for routing data packets. In process switching, processor 110 of node N1 determines a next hop node for a received data packet using routing programs 114, neighbor node information database 118, and neighbor node error pattern database 116. In fast switching, a next hop node for a received packet is determined based on cached information about a next hop node that was previously determined using process switching for a previously received data packet in the same packet session as the received data packet.

In FIGS. 1A and 1B, process switching may be used for data packets that are the first data packets received in node N1 for a packet session. The packet session comprises a sequence of related data packets sent between a source node and a destination node, where a next hop node needs to be determined at node N for the packet session as packets pass through node N1 from source to destination. Fast processing may then be used to route data packets subsequent to the first data packet in the session until it is necessary to use process switching to determine an updated next hop node as node N1. Process switching may be used anytime it is desired to update the next hop node used by node N1 in the routing of data packets in an ongoing session. In the implementation, node N1 may switch to routing a packet to an updated next hop node by using processing switching based on changes in neighbor node error patterns or other information associated with neighbor nodes during an ongoing session.

For example, data packets sent from host A 102 to host B 104 may form a single packet session such as a packet session for a video conference call. In this case, process switching may be used at node N1 to determine a next hop node (next node in the route after node N1) for the first data packet in the session routed to node N6 through node N1. For example, node N1 may determine node N3 as the next hop node. However, once one data packet in the session has been process switched to node N3 as the next hop node, node N1 now understands the way to switch all successive packets in the packet session to the same next hop node N3. That is because process switching caches (stores a copy of the outcome) of the forwarding/routing decision after it has been made. Using the cached information (IP destination address, port number, link address, and any other necessary details) may speedup the forwarding/routing by reducing processing load on processor 110. Fast switching may be used for data packets that are not the first data packet in a data packet session to be routed from node N1 to next hop node N3 and then onward to a destination address node N6 for the packet session. Memory 112 may include a forwarding route cache that may store information that is used for determining the next hop node and the ports of 106(1)-106(n) on which the data packet is sent on, for fast switching of data packets in the same session. In the implementation of FIGS. 1A and 1B, information in the neighbor node information database 118 and neighbor node error pattern database 116 are used when determining next hop nodes for routing data packets in packet sessions. Error pattern monitoring database 120 is used to collect bit error pattern information that node N1 sends to neighbor nodes to be used by the neighbor nodes in routing data packets when node N1 is a potential next hop node of the neighbor nodes.

Figure 2A:
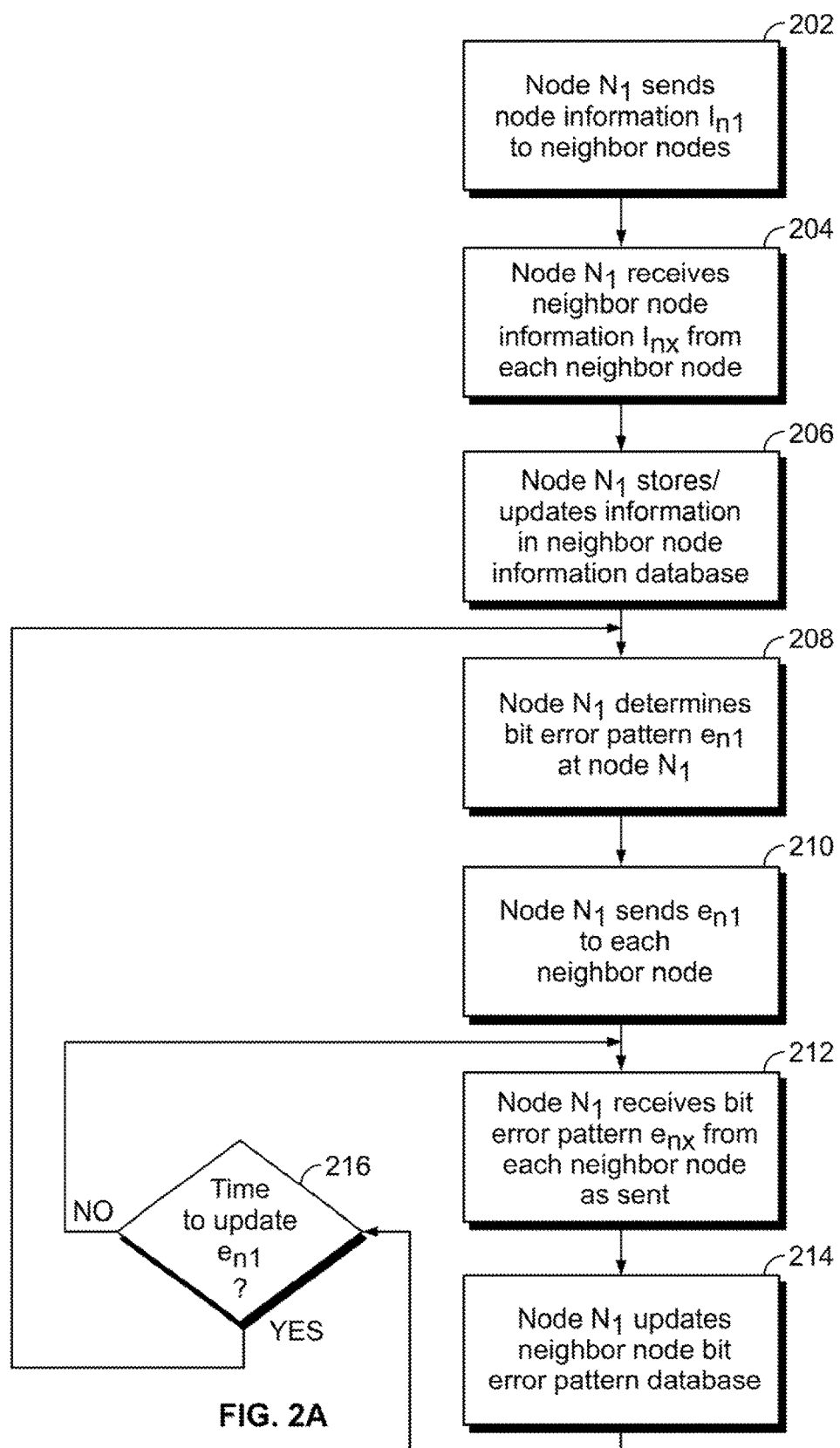
FIG. 2A is a flow diagram illustrating operations performed for collaboratively sharing information in an example network node.

FIG. 2A is a simplified flow diagram illustrating example operations performed for collaboratively sharing information in an example network node. FIG. 2 may be explained with reference to FIGS. 1A and 1B. FIG. 2A shows example operations by which node N1 collaboratively shares its bit error pattern information $e_{n1}$ and other node information $I_{n1}$ with its neighbor nodes. In FIG. 1, each node NX of nodes N2-N6 will similarly collaboratively share its bit error pattern information $e_{nx}$ and other node information $I_{nx}$ with its neighbor nodes.

The process begins at 202 where node N1 sends node information $I_{n1}$ for node N1 to its neighbor nodes N2, N3, and N4. Processor 110 of node N1 may send node information $I_{n1}$ or updated node information $I_{n1}$ as necessary. For example, node information may be sent when node N1 is powered up in network 100 for the first time, or after being shut down for maintenance and then powered up. The node information $I_{n1}$ may include addressing information that may be used by other nodes to reach node N1. The node information $I_{n1}$ may also include information about the error correction capabilities of node N1 and the error correction that node N1 is currently using. At 204, node N1 receives neighbor node information $I_{nx}$ ($I_{n2}$, $I_{n3}$, $I_{n4}$) from each of its neighbor nodes N2, N3, and N4. The node information $I_{nx}$ may include addressing information that may be used by other nodes to reach node N2, N3, or N4. The node information $I_{nx}$ may also include information about the error correction capabilities of nodes N2, N3, and N4, and the error correction that nodes N2, N3, and N4 are currently using. At 206, node N1 then stores/updates node information $I_{n2}$, $I_{n3}$, and $I_{n4}$ in neighbor node information database 118.

At 208, node N1 determines a bit error pattern $e_{n1}$ for received data packets that are addressed to destination node N1 and processed at node N1. Processor 110 may determine bit error patterns for individual packets or groups of data packets over a time period and save bit error patterns in error pattern monitoring database 120. The time period may set to provide a desired of accuracy. For example, during network busy periods when many users are on the network, the time period may be set in seconds. In less busy time periods, the time period may be set in minutes or hours. Processor 110 may then determine a bit error pattern $e_{n1}$ for node N1, for example based on an average for all data packets received in the time period. The bit error pattern $e_{n1}$ may comprise information on average numbers of errors and location of bit errors in code words, including a measure of relative randomness to burstiness of bit errors at node N1.

Next, at 210, node N1 sends $e_{n1}$ to each of its neighbor nodes N2, N3, and N4. At 212, processor 110 retrieves any error patterns $e_{n2}$, $e_{n3}$, and $e_{n4}$, received from neighbor nodes N2, N3, and N4 and, at 214, updates neighbor node error pattern database 116. In an implementation, node N1 may receive the error patterns at time intervals, depending on how often each neighbor node updates and sends out its error patterns, and store the error patterns in a neighbor node error pattern queue as the error patterns are received. Processor 110 may then periodically check the queue at predetermined times for updated neighbor node error patterns. In the implementation of FIG. 2, the queue may be checked for updated neighbor node error patterns each time operation 212 is performed.

Next, at 216, node N1 determines whether it is time to update $e_{n1}$. Node N1 may be configured to update $e_{n1}$ at time intervals that provide a current and accurate error pattern $e_{n1}$ for use by the other nodes. For example, during network busy periods when many users are coming on and leaving the network the updating may be performed at time intervals of seconds. In less busy time periods the time period for updating may be set in minutes or hours. If it is determined to be time to update $e_{n1}$, the process moves to 208 and continues from 208 where processor 110 may continue to determine bit error patterns for individual packets or groups of data packets over a time period and save bit error patterns in error pattern monitoring database 120. Processor 110 may then determine an updated bit error pattern $e_{n1}$ for node N1 and send the updated $e_{n1}$ to nodes N2, N3, and N4 at operation 210 before moving to operation 212. If it is determined that it is not time to update $e_{n1}$ the process moves directly to 212 and continues from 212 where processor 110 retrieves any error patterns $e_{n2}$, $e_{n3}$, or $e_{n4}$ received from neighbor nodes N2, N3, and N4, and, at 214, updates neighbor node error pattern database 116 before returning to operation 216.

Operations 208-216 of FIG. 2A will be repeated by node N1 allowing node N1 to collaboratively share its bit error pattern information $e_{n1}$ with its neighbor nodes. Each of the other nodes N2-N6 of network 100 will also repeat operations 208-216 to collaboratively share bit error pattern information with neighbor nodes. This collaborative sharing of bit error pattern information allows each node to determine next hop nodes in network 100 by making decisions with current information at the bit error level.

Also, once operations 202-206 have been initially performed, anytime node information $I_{n1}$ changes in node N1, node N1 may inform neighbor nodes N2, N3, and N4 and those nodes may update information $I_{n1}$ in their neighbor node information databases. Each of the neighbor nodes N2, N3, and N4 will also collaboratively share updated neighbor node information with node N1 if necessary when the node information changes. Node N1 may then update the appropriate neighbor node information, $I_{n2}$, $I_{n3}$, or $I_{n4}$, in neighbor node information database 118. A node may collaboratively share updated node information, for example, if the node is added to network 100, if the node is shut down for maintenance, if the node is powered up after maintenance, or if the node's relevant configurations, such as error correcting capabilities, are changed and/or updated.

Figure 2B:
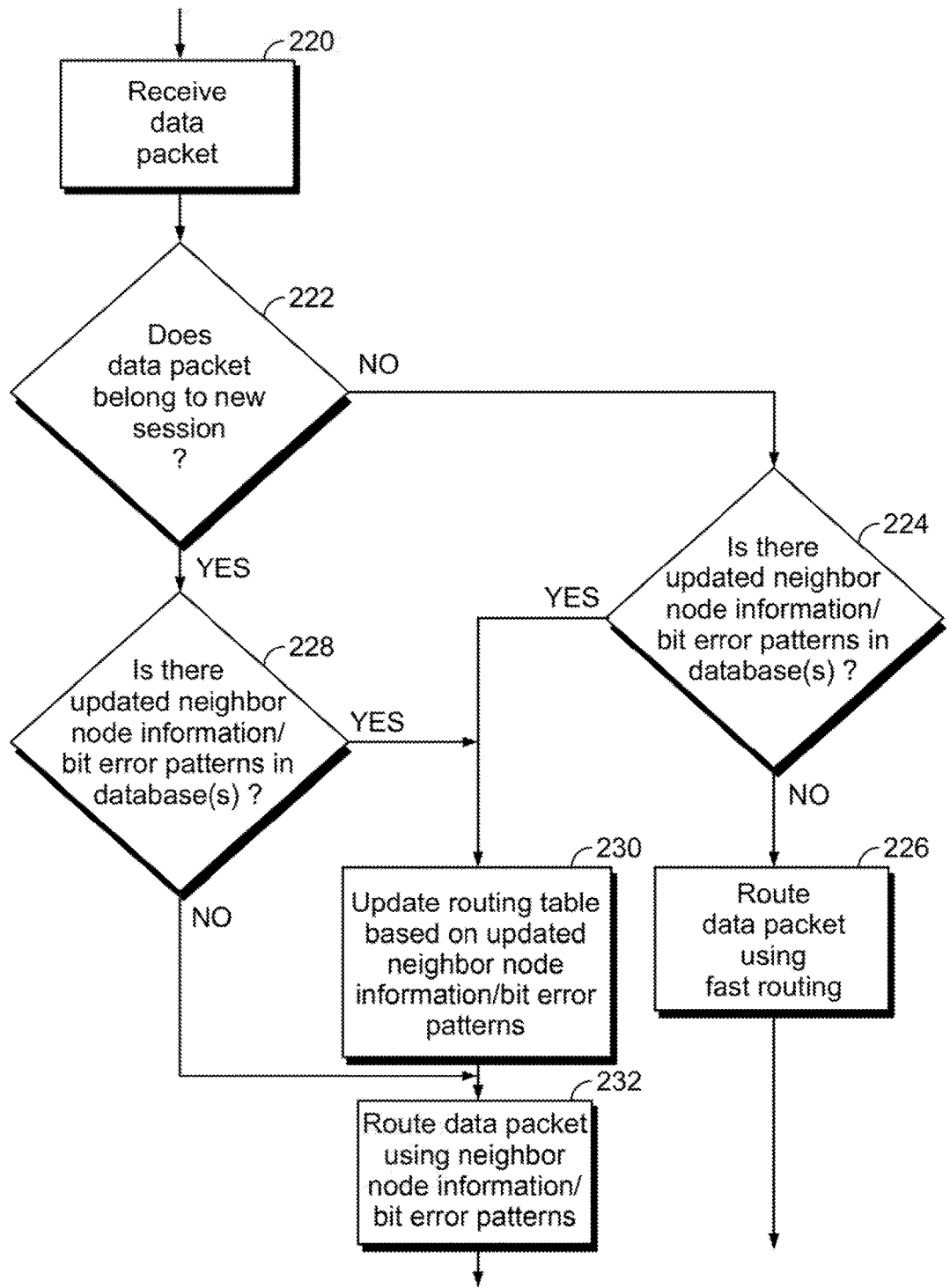
FIG. 2B is a flow diagram illustrating operations performed for routing data packets using bit error pattern information in an example network node.

FIG. 2B is a flow diagram illustrating operations performed for routing data packets based on bit error pattern information in an example network node. FIG. 2B shows the operations that may be performed in a node of network 100 when data packets are received for forwarding on to a next hop node. For example, the operations of FIG. 2B may be performed at node N1 when data packets are received at node N1 for forwarding on to a next hop node of nodes N2, N3, or N4 on the way to a destination node in network 100 or in another network.

The process begins at 220 when a data packet is received by node N1 at one of ports 106(1)-106(n). At 222, processor 110 checks header information in the data packet header to determine if the received data packet belongs to a new session or if the data packet belongs to an ongoing session for which data packets have already been routed. Processor 110 may check this by determining if routing programs already have a next hop node stored in program routing tables for data packets having the source and destination addresses indicated in the packet header. If it is determined that the data packet belongs to a new packet session, i.e., the data packet is the first data packet received for a packet session, the process moves to operation 228.

At 228, processor 110 determines if there is any updated neighbor node information in neighbor node information database 128, and/or any updated bit error pattern in neighbor node bit error pattern database 116. The updated neighbor node information and/or bit error pattern may be information collaboratively shared with node N1 through the process of FIG. 2A by neighbor nodes N2, N3, and N4 as the process of FIG. 2A is performed in the background over time. The updated neighbor node information and/or bit error pattern may be information received from neighbor nodes since the routing programs 114 last routed a data packet using the current routing tables in process routing. If there is any updated neighbor node information and/or any updated bit error pattern, the process moves to 230. At 230, processor 110 updates the routing tables of routing programs 114 based on the updated neighbor node information and/or bit error patterns. The routing tables may include information on connections and various alternative routing paths through the network for various destination nodes. The neighbor node information and neighbor node bit error patterns may be associated in the routing tables with next hop nodes of the various connections and various alternative routing paths to destination nodes.

Next, at 232, processor 110 determines a next hop node of nodes N2, N3, or N4, and the data packet is routed and sent to the next hop node. Processor 110 determines the next hop node by process routing that uses the neighbor node information and/or bit error patterns in the routing tables. In one implementation, processor 110 may determine that a destination address for the data packet may be reached through one or more available next hop nodes. Then the next hop node may be selected from the available next hop nodes based on a bit error pattern $e_{nx}$, where $e_{nx}$ comprises a number of bit errors per code word that node NX is currently correcting. For example, if it is determined that nodes N2, N3, or N4 are available next hop nodes, bit error patterns $e_{n2}$, $e_{n3}$, and $e_{n4}$, may be compared and the node of N2, N3, or N4, having the lowest bit errors per code word as indicated by pattern $e_{n2}$, $e_{n3}$, and $e_{n4}$, respectively, may be selected as the next hop node. The bit error patterns may also be combined with other information in determining a next hop node. For example, the relative latency or time delay of the data packet to the destination from node N1 through each of the available next hop nodes may be taken into account as well as the bit error patterns of each available next hop node. In this case, the latency and bit error pattern effects on a data packet session may be weighed relative to one another in the determination of the next hop node. In certain applications in which speed is important, latency considerations may be prioritized and given a higher weighting as compared to bit error considerations.

In another implementation, the error patterns $e_{n2}$, $e_{n3}$, and $e_{n4}$, may each comprise a measure of relative randomness to burstiness of bit errors in code words received at nodes N2, N3, and N4, respectively. The measure of relative randomness to burstiness of bit errors may be utilized because certain error correcting codes are configured to be most effective depending on whether the bit errors the code is correcting are random or bursty. For example, a forward error correction code configured for maximum error correction capability when correcting bursty errors may be used on the links between node N1 and nodes N2, N3, and N4. In this case, if it is determined that nodes N2, N3, or N4 are available next hop nodes, bit error patterns $e_{n2}$, $e_{n3}$, and $e_{n4}$, may be compared and the node of N2, N3, or N4, having the lowest measure of relative randomness to burstiness as indicated by patterns $e_{n2}$, $e_{n3}$, and $e_{n4}$, respectively, may be selected as the next hop node. The measure of relative randomness to burstiness of bit errors may also be combined with other information in determining a next hop node. For example, the relative latency or time delay of the data packet to the destination from node N1 through each of the available next hop nodes may be taken into account as well as the measure of relative randomness to burstiness of bit errors at each available next hop node. In this case the effects of latency and the measure of relative randomness to burstiness on the data packet session may be weighed relative to one another in the next hop node decision.

If however, at 228, it is determined that there is not any updated neighbor node information in neighbor node information database 128 and/or bit error patterns in neighbor node bit error pattern database 116, the process moves to 232. The routing operation at 232 would then be performed for the data packet similarly as described for the case when operation 232 is entered from operation on 230, except the routing tables would not be updated with new neighbor node information of neighbor node error patterns as is done at 230. In this case, the neighbor node information and bit error patterns previously stored in routing tables of routing programs 114 would be used in process routing.

If, at 222, it is determined that the data packet does not belong to a new data packet session the process moves to 224. At 224, processor 110 determines if there is any updated neighbor information in neighbor node information database 128 and/or any updated bit error pattern in neighbor node bit error pattern database 116. Processor 110 may perform the operation at 224 in the same manner as was described for operation 228. If, at 224, it is determined that there is not any updated neighbor node information and/or bit error patterns, the process moves to 226. At 226 processor 110 performs fast routing and the data packet is routed to a next hop node for the session based on cached routing information that indicates the next hop node used for previous packets in the session.

If, at 224, is determined that there is updated neighbor node information in neighbor node information database 128 and/or any updated bit error patterns in neighbor node bit error pattern database 116, the process moves to 230. At 230, processor 110 updates the routing tables of routing programs 114 based on the updated neighbor node information and/or neighbor node bit error patterns. The updating of the routing tables may be performed in a similar manner as was described for operation 230 in the case when operation 230 is entered from operation 228.

Next, at 232, processor 110 determines a next hop node of nodes N2, N3, or N4, and the data packet is routed and sent to the next hop node. Processor 110 determines the next hop node by process routing and using the neighbor node information and/or bit error patterns in the routing tables for the determination. Processor 110 may determine the next hop node in a similar manner as was described previously for operation 230.

In another implementation, node N1 may also use the neighbor node information/neighbor node bit error pattern information of nodes N2, N3, and N4 to preemptively make decisions about routing or transmission parameter adaption to prevent or minimize the occurrence of bit errors in the network. For example, the neighbor node information $I_{n2}$, $I_{n3}$, and $I_{n4}$ in neighbor node database 102 may include the error correcting capability of error correction codes used in nodes N2, N3, and N4, respectively. If node N1 is currently routing data traffic to node N2 as the next hop node in an ongoing data packet session over channel a, processor 110 of node N1 may receive an updated bit error pattern $e_{n2}$ given as a number of errors occurring and corrected at node N2. In the routing determination at 232, processor 110 may compare the bit error pattern $e_{n2}$ to the error correction capability of node N2 that is included in $I_{n2}$. When the number of errors indicated in $e_{n2}$ approaches the bit error correction capability indicated in $I_{n2}$, processor 110 may make a determination to route to another node with a greater margin of difference between its number of errors and error correction capability. This routing may be used to preemptively prevent bit errors that cannot be corrected from occurring. For example, if $e_{N2}$ indicates that node N2 is correcting 10 errors with an error correction capability of 11 errors and $e_{N3}$ indicates that node N3 is correcting 12 errors with an error correction capability of 22 errors, node N1 may switch to routing its data traffic to node N3 over channel b as the next hop node instead of node N2. The data will then be routed to node N6 from node N3 over channel j. In this implementation, this routing may be done even though the number of bit errors at node N2 is less than the number of bit errors at node N3. In an alternative, an updated bit error pattern $e_{n2}$ given as a measure of relative randomness to burstiness of bit errors at node N2, may indicate that bit errors at node N2 are becoming increasingly random and neighbor node information $I_{n2}$ and $I_{n3}$ may indicate that node N3 has an error correcting capability better equipped to handle random bit errors than the error correcting capability of node N2. When the randomness of the bit errors approaches a certain level, node N1 may switch to routing data traffic to node N3 instead of node N2.

In another implementation of network 100 of FIG. 1, node N1 may use a bit error pattern, such as bit error pattern $e_2$ from node N2, in making determinations as to how to adapt transmission parameters used for sending data traffic to neighbor nodes. For example, node N1 may increase or decrease the data rate, or change the error correction coding, for data packets sent to node N2 based on an error pattern $e_2$ received from node N2.

In a further implementation of network 100 of FIG. 1, node N1 may also use the neighbor node bit error pattern information of nodes N2, N3, and N4 and the type of traffic of the data packets to make decisions about routing or transmission parameter adaption to prevent or minimize the occurrence of bit errors in the network. In one example, node N1 may determine the traffic type of the data packets using deep packet inspection. Also, memory 112 of node N1 may include a database comprising information associating the type of traffic of the data packets to a quality of service value, and node N1 may determine the next hop node based on the neighbor node bit error pattern information and the quality of service value associated with the type of traffic of the data packets. For example, packets of data traffic associated with a lower quality of service may be routed to a first neighbor node having a relatively higher number of bit errors indicated in that first neighbor node's error pattern. This may be used to maintain bandwidth to a second neighbor node, having a relatively lower number of bit errors indicated in that second neighbor node's error pattern, for packets of data traffic associated with a higher quality of service.

In a further implementation of network 100 of FIG. 1, network 100 may comprise an apparatus for managing routing within nodes N1-N6. The apparatus may be a separate server device or may be implemented in one of nodes N1-N6. The apparatus may function to receive node information In1, In2, In3, In4, In5, and In6 from each of nodes N1, N2, N3, N4, N5, and N6. The node information may include addressing information that may be used by other nodes to reach a node. The node information may also include information about the error correction capabilities, and the error correction that the nodes are currently using. The apparatus may store/update the node information in a database as the node information is received and/or updated. The apparatus may also receive bit error patterns $e_{n1}$, $e_{n2}$, $e_{n3}$, $e_{n4}$, $e_{n5}$, and $e_{n6}$ from nodes N1, N2, N3, N4, N5, and N6 as the bit error patterns are determined by each node and updated during network operation. Based on the bit error patterns and the node information for each of the nodes, the apparatus may determine packet data traffic routing/management information and provide the information to nodes N1, N2, N3, N4, N5, and N6. The apparatus may also include a database including information associating types of data traffic to different quality of service values, and the packet data traffic routing/management information may include information to manage the nodes to take quality of service values into account when routing data packets.

In another embodiment, node information and/or node bit error pattern information may be collaboratively shared between nodes comprising devices transmitting and receiving on one or more wireless channels in a communications network. Devices that communicate with each other on the one or more channels may collaboratively share node information. Devices that receive on each of the one or more channels may determine bit error pattern information associated with each of the one or more channels at that receiving device. The devices may then collaboratively distribute the error pattern information associated with the one or more channels to devices transmitting on the one or more channels or devices that potentially will transmit on the one or more channels. The transmitting devices may utilize the bit error pattern information in making transmission parameter adaption decisions when transmitting on the one or more channels or when initiating transmission on the one or more channels. The transmission parameter adaption may include setting data rates, setting error correction capabilities, or selecting channels on which to transmit.

Figure 3A:
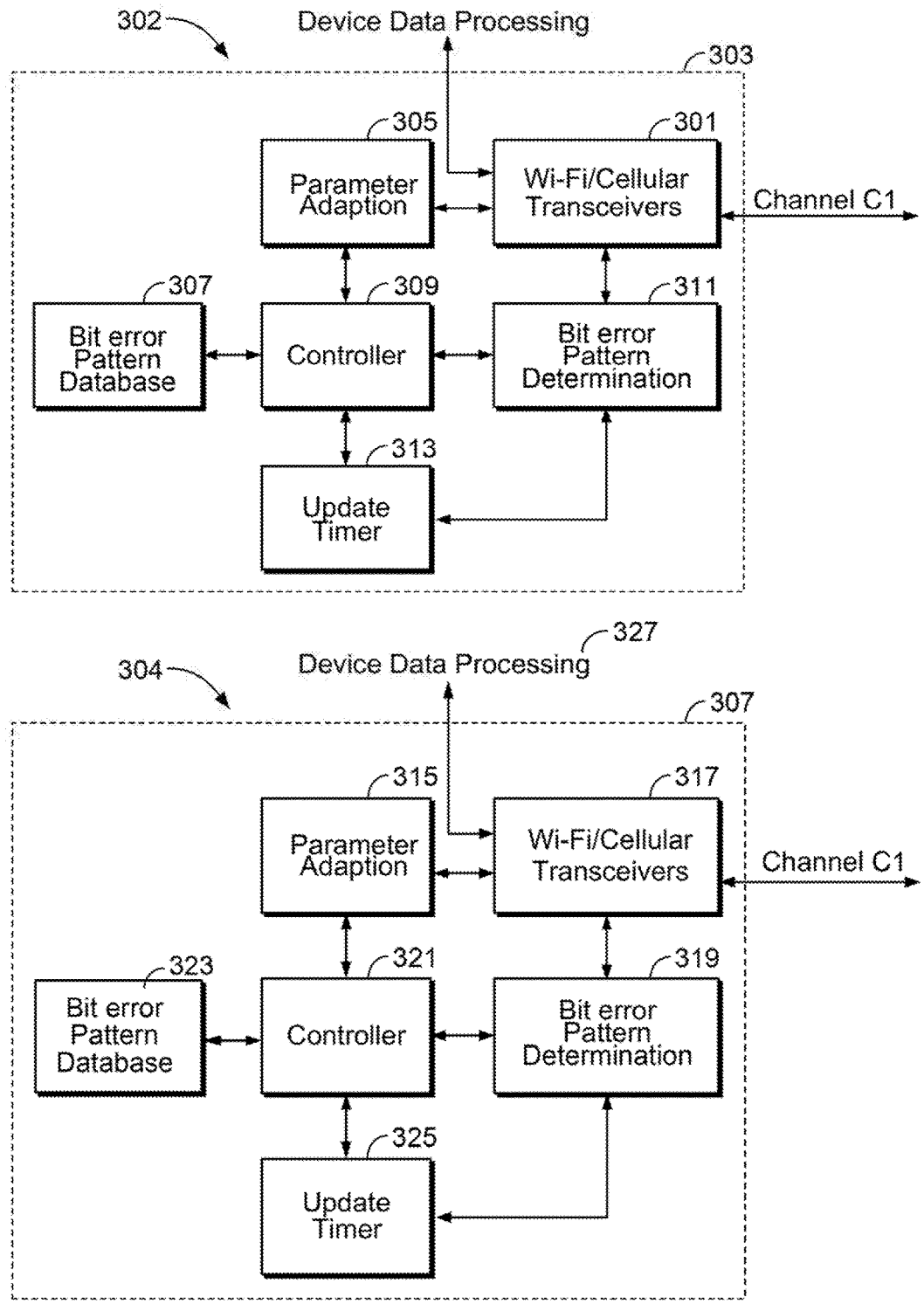
FIG. 3A is a diagram illustrating portions of example devices.

FIG. 3A illustrates portions 303 and 307 of example devices implemented to perform operations according to the embodiments. FIG. 3A shows portion 303 of a device 302 and portion 307 of a device 304. Portion 303 of device 302 includes Wi-Fi/cellular transceivers 301, bit error pattern determination function 311, update timer 313, controller 309, bit error pattern database 307, and parameter adaption function 305. Portion 307 of device 304 includes Wi-Fi/cellular transceivers 317, bit error pattern determination function 319, update timer 325, controller 321, bit error pattern database 323, and parameter adaption function 315.

FIG. 3B is a diagram illustrating example devices in an implementation of the embodiments. FIG. 3B shows a scenario in which device 302 is communicating with access point 304 on channel C1. Device 302 may comprise any type of mobile device or computing device that is configured to communicate with access point 304 and includes the functions of portion 303 of FIG. 3A. Access point 304 may include the functions of portion 307 of FIG. 3A. In one example, device 302 and access point 304 may communicate with one another according to a wireless protocol such as one of the protocols specified in the IEEE 802.11 standards specifications. In other examples, device 302 may comprise a mobile cellular device and access point 304 may comprise a cellular base station operating according to a wide band code division multiple access (WCDMA) system protocol, long term evolution (LTE) system protocol, or other cellular protocol. In FIG. 3B, device 302 is shown adapting its data transmission parameter set between time T1 and T2 according to bit error pattern $e_1$ which is collaboratively shared from access point 304.

FIG. 3C is a flow diagram illustrating operations performed by the devices of FIGS. 3A and 3B in an example implementation. FIG. 3C may be explained using device 302 and access point 304 of FIGS. 3A and 3B as device 1 and device 2, respectively, of FIG. 3C. In another implementation, device 302 and access point 304 could be used as device 2 and device 1, respectively.

The process begins at 306 when device 302 initiates operation on channel C1. The operation on channel C1 may include data traffic transmissions from device 302 to access point 304 at time $T_1$ using Wi-Fi/cellular transceivers 301 and 317 having a transmission parameter set that comprises data rate $DR_1$, and error correction coding 1 ($ECC_1$). As data transmissions are sent to access point 304, access point 304 receives the data transmissions at Wi-Fi/cellular transceivers 317 and sends the data to device data processing 327 for sending onward into the network. Also, at 308, as access point 304 receives and decodes the data transmissions, bit error pattern determination function 319 tracks bit errors and determines a bit error pattern $e_2$ for transmissions to access point 304 on channel C1. In an implementation, bit error pattern determination function 319 may determine bit error pattern $e_2$ using only transmissions received from device 302 on channel C1. In another implementation, bit error pattern determination function 319 may determine bit error pattern $e_2$ using transmissions received from multiple devices on channel C1. The bit error pattern $e_2$ may be determined over a time period or over a selected number of code words. In an example implementation, bit error pattern $e_2$ may comprise a parameter that indicates a number of bit errors per code word at access point 304. In another example implementation, bit error pattern $e_2$ may comprise a measure of relative randomness to burstiness, or a measure of burst length of bit errors in code words at access point 304. At 309, controller 321 controls bit error pattern determination function 319 to send the current bit error pattern $e_2$ to device 302. Controller 309 receives the error pattern e2 through Wi-Fi/cellular transceivers 301 and stores error pattern $e_2$ in bit error pattern database 307.

Next, at 310, parameter adaption function 305 of device 302 determines if bit error pattern $e_2$ is greater than a threshold bit error pattern $E_T$ by comparing $e_2$ to $E_T$. For example, in an implementation in which $e_2$ indicates a number of bit errors per code word, $E_T$ may indicate a threshold amount of bit errors per code word for data transmissions from device 302. When bit errors in a code word are above the threshold amount of bit errors, it may be determined that $e_2$ is greater than $E_T$ at 310. In another example, in an implementation in which $e_2$ indicates a measure of relative randomness to burstiness of bit errors in code words, $E_T$ may indicate a threshold level of a measure of relative randomness to burstiness or a measure of burst length for bit errors of code words in data transmissions from device 302. For example, when bit errors in a code word are above a threshold level of relative randomness to burstiness, it may be determined that $e_2$ is greater than $E_T$ at 310. In another implementation, $e_2$ may indicate both a threshold for a measure of randomness to burstiness for bit errors and a threshold for a number of bit errors per code word. In this case $E_T$ may be a combined threshold for a measure of relative randomness to burstiness for bit errors and a number of bit errors per code word. For the combined threshold, the determination at 310 may comprise determining whether both the measure of relative randomness to burstiness for bit errors and the threshold for a number of bit errors per code word were greater than their individual thresholds. If it is determined at 310 that bit error pattern $e_2$ is not greater than $E_T$, the process moves to 314. At 314, controller 321 of access point 304 determines if it is time to update error pattern $e_2$. Update timer 325 may be checked for this determination. If it is determined it is not time to update $e_2$, the process repeats the determination at 314 at time intervals until it is determined it is time to update $e_2$. Update timer 325 may be set to indicate an update at selected time intervals. In one implementation, the time intervals set by update timer 325 for updating the error pattern information may be based, for example, on the degree of fading of the wireless channel used in a mobile network. The more severe the fading on channel C1 the more often the error pattern information needs to be updated.

The process then moves back to 308 where bit error pattern determination function 319 of access point 304 determines error pattern $e_2$ and begins the process again using an updated error pattern $e_2$.

If however, at 310, parameter adaption function 305 of device 302 determines that $e_2$ is greater than $E_T$, the process moves to 312. At 312, parameter adaption function 305 then adapts the parameter set used on channel C1 for data transmissions from Wi-Fi/cellular transceivers 301 to access point 304. As part of operation 312, parameter adaption function 305 may negotiate the adaption of the parameters with parameter adaption function 315 of access point 304. If device 302 and access point 304 disagree, access point 304 may control the rate adaption decision. In an implementation in which $e_2$ indicates a number of bit errors per code word, the adaption of the transmission parameter set may comprise adapting the data rate $DR_1$ and/or the error correction coding $ECC_1$ to reduce the number of bit errors occurring. In an implementation in which $e_2$ indicates a relative measure of randomness to burstiness of bit errors in code words, the adaption of transmission parameter set 1 may comprise adapting the data rate $D_{R1}$ and/or the error correction coding $ECC_1$ to account for an increase in randomness or business of the bit errors. For example, data rate $D_{R1}$ may be adapted by changing to a new data rate $D_{R2}$ that is less than data rate $D_{R1}$ to reduce the number of errors or the randomness/burstiness of the errors occurring. In another example, error correcting code $ECC_1$ may be changed to an error correcting code $ECC_2$ that is more robust and more capable of protecting against errors that are more random or more bursty than $ECC_1$ is able to protect against. In an implementation in which $e_2$ indicates both a measure of relative randomness to burstiness for bit errors and a number of bit errors per code word, the data rate $D_{R1}$ and/or the error correction coding $ECC_1$ may be adapted to reduce the number of errors and the randomness/burstiness of the errors occurring. FIG. 3B shows the updated parameter set being used by device 302 at time $T_2$.

In another implementation of FIG. 3C, the adaption of transmission the parameter set on channel 1 may also comprise changing to a new data rate that is faster than the current data rate and/or changing to an error correcting code $ECC_2$ that is less robust and less capable of correcting a larger number of errors to increase data throughput when channel conditions are better. This may be done, for example, by comparing $e_2$ to $E_T$ to determine if the bit error pattern $e_2$ is less than a threshold for a measure of relative randomness to burstiness for bit errors and/or less than a threshold for a number of bit errors per code word. In this case when fewer bit errors are occurring and/or randomness/burstiness of bit errors is low it may be desirable to increase data throughput by adapting the data rate higher or using error correcting codes less capable of correcting a certain level of randomness/burstiness. This implementation may be used in combination with FIG. 3B to dynamically adjust the data rate up or down based on error pattern $e_2$ as channel conditions change. The implementation may also be used to dynamically adjust the error correction coding to be more stringent or less stringent based on $e_2$ as channel conditions change.

In a further implementation of FIG. 3C, the operations of FIG. 3C may be performed in a reciprocal manner by device 302 and access point 304. In this implementation, both device 302 and access point 304 may receive a bit error pattern from the other and adapt transmission parameters accordingly. For example, access point 304 may send bit error pattern $e_2$ associated with bit errors on channel C1 at access point 304, and device 302 may send bit error pattern $e_1$ associated with bit errors on channel C1 at device 302. Device 302 and access point 304 may then adapt their transmission parameters on channel C1 based on the bit error patterns $e_2$ and $e_1$, respectively. The adaption of transmission parameters may include negotiation between device 302 and access point 304 to determine mutually agreed upon transmission parameters. In one example of negotiation, if device 302 and access point 304 disagree, access point 304 may control the rate adaption decision.

In other implementations of FIG. 3C, access point 304 may also share bit error pattern $e_2$ with other access points in the network, or provide bit error pattern $e_2$ to a network database. For example, the network database may be a database use by network administrators in making network configuration decisions based on bit error patterns occurring at network access points.

FIG. 3D is a flow diagram illustrating operations performed by the devices of FIGS. 3A and 3B in another example implementation. FIG. 3D may be explained using device 302 and access point 304 of FIGS. 3A and 3B as device 1 and device 2, respectively, of FIG. 3D. In another implementation, device 302 and access point 304 could be used as device 2 and device 1, respectively. The process of FIG. 3D is basically the same as the process of FIG. 3C except that operation 320 of FIG. 3D uses an alternative method of comparison as compared to operation 310 of FIG. 3C.

When the process of FIG. 3D reaches operation 320, parameter adaption function 305 of device 302 determines if bit error pattern $e_2$ is within a margin of a maximum allowed threshold value $E_{cap}$ by comparing $E_{cap}$ with $e_2$. For example, $E_{cap}$ may comprise a value indicating a maximum number of bit errors per code word that access point 304 is capable of correcting and it may be determined if $E_{cap}-e_2$ is greater than the margin. If $E_{cap}\text{-}e_2$ is greater than the margin the process may move to 324. If $E_{cap}\text{-}e_2$ is not less than the margin the process may move to 322. At 322, device 302 may adapt the transmission parameter set that comprises data rate $DR_1$, and error correction coding 1 ($ECC_1$) based on the determination of 320. The margin used at operation 320 may be set to allow bit errors to be preemptively prevented from occurring. The margin may also be set differently for different applications on device 302. The margin may be set higher for applications that require higher quality transmissions with less bit errors so that the parameters are adapted before errors occur. In an implementation in which $e_2$ indicates a number of bit errors per code word, the adaption of the parameter set may comprise adapting the data rate $DR_1$ and/or the error correction coding $ECC_1$ to reduce the number of bit errors occurring and increase $E_{cap}\text{-}e_2$. In an implementation in which $e_2$ indicates a relative measure of randomness to burstiness of bit errors in code words, the adaption of the parameter set may comprise adapting the data rate $DR_1$ and/or the error correction coding $ECC_1$ to account for an increase in randomness/burstiness of the bit errors and to increase the value of $E_{cap}\text{-}e_2$. For example, data rate $DR_1$ may be adapted by changing to a new data rate $DR_2$ that is less than data rate $DR_1$ to reduce the number of errors or the randomness/burstiness of the errors occurring. In another example, error correcting code $ECC_1$ may be changed to an error correcting code $ECC_2$ that is more robust and capable of correcting a larger number of errors or errors that are more random or bursty than $ECC_1$ is able to correct. In an implementation in which $e_2$ indicates both a measure of randomness to burstiness for bit errors and a number of bit errors per code word, one or both of the data rate DR1 and/or the error correction coding $ECC_1$ may be adapted to reduce the number of errors and the randomness of the errors occurring to increase the value of $E_{cap}\text{-}e_2$. FIG. 3B shows the updated parameter set being used by device 302 at time T2.

In other implementations of FIG. 3D, the adaption of transmission parameter set 1 on channel 1 at 322 may also comprise changing to a new data rate that is faster than the current data rate and/or changing to an error correcting code $ECC_2$ that is less robust and less capable of correcting a larger number of errors to increase data throughput when channel conditions are better. For example, this may be done when it is determined at 320 that $E_{cap}\text{-}e_2$ is increasing in value indicating that fewer bit errors are occurring and/or the randomness or burstiness of the bit errors is decreasing. In this case, when fewer bit errors are occurring and/or randomness or burstiness of bit errors is low, it may be desirable to increase data throughput by adapting the data rate higher or using less stringent error correcting codes. This implementation may be used in combination with FIG. 3C to dynamically adjust the data rate up and down based on error pattern $e_2$ as the value of $E_{cap}\text{-}e_2$ changes up and down. The implementation may also be used to dynamically adjust the error correction coding to be more stringent or less stringent as the value of $E_{cap}\text{-}e_2$ changes up and down.

In other implementations of FIGS. 3C and 3D, device 302 may utilize bit error pattern $e_2$ to make adapt transmission parameters by changing the channel on which device 302 transmits to access point 304. For example, if device 302 and access point 304 are capable of communicating on more than one channel, device 302 may switch to a channel other than channel C1 if $e_2$ indicates unacceptable bit error patterns are occurring on channel C1.

In further implementations of FIGS. 3C and 3D, device 302 may adapt transmission parameters based on the bit error pattern and the type of the data traffic device 302 is transmitting to device 304. In one example, device 302 may determine a type of the data traffic using deep packet inspection. Also, device 302 may include a database comprising information associating the type of the data traffic to a quality of service value. Device 302 may adapt transmission parameters based on the bit error pattern and the quality of service value associated with the type of the data traffic. For example, higher quality of service requirements related to latency may restrict how much the data rates are reduced, or lower quality of service requirements may restrict how much the data rate is increased, based on the bit error pattern.

Figures 4A, 4B, 4C:
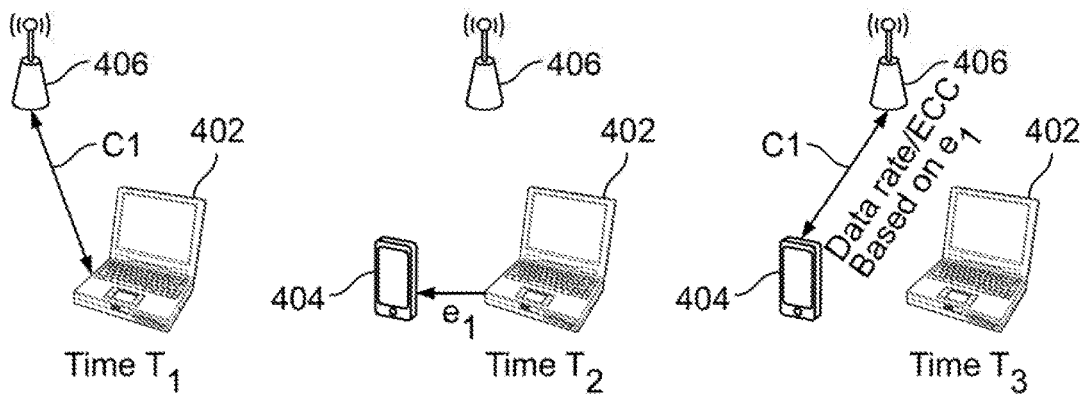
FIGS. 4A, 4B, and 4C are diagrams illustrating example devices in a further implementation of the embodiments.
Figure 4D:
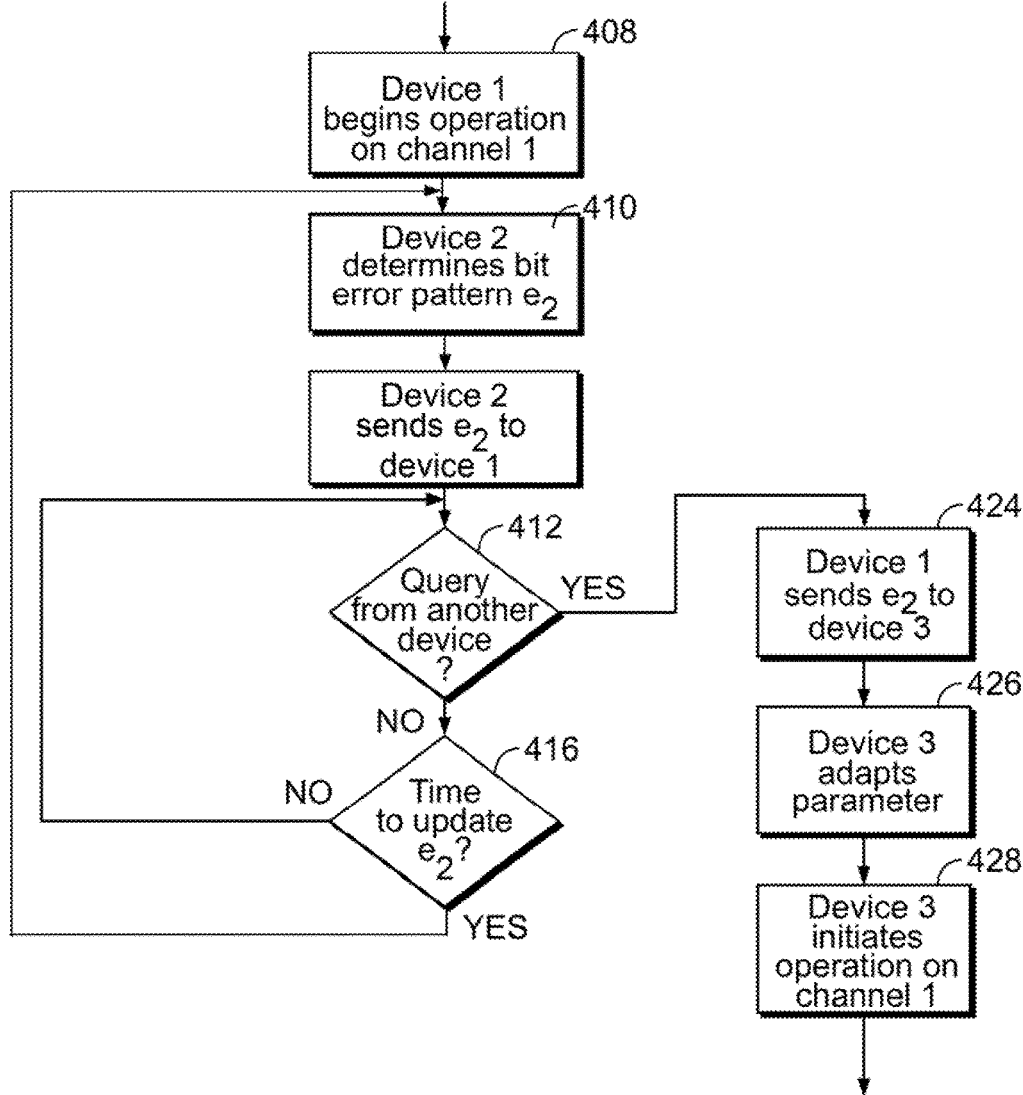
FIG. 4D is a flow diagram illustrating operations performed by the example devices of FIGS. 4A, 4B, and 4C; and, FIG. 5 illustrates an implementation of an example device.

FIGS. 4A, 4B, and 4C are diagrams illustrating example devices in a further implementation of the embodiments. FIGS. 4A-4C show a sequence in which device 402 is shown collaboratively sharing bit error pattern information with device 404. FIG. 4D is a flow diagram illustrating operations performed by the example devices in FIGS. 4A-4C. FIG. 4D may be explained with reference to FIGS. 4A-4C using device 402 as device 1, access point 406 as device 2, and device 404 as device 3.

The process of FIG. 4D begins at 408 when device 402 begins operation on channel C1 as shown in FIG. 4A. The operation on channel 1 may include data traffic transmissions from device 402 to access point 404 at time T1. As data transmissions are sent to access point 406, access point 406 receives the data transmissions and sends the data transmission onward toward a destination in the network infrastructure. As access point 406 receives and decodes the data transmissions, at 410, access point 406 also tracks bit errors and determines a bit error pattern $e_2$ for transmission from device 402 on channel C1. The bit error pattern $e_2$ may be determined over a time period or over a selected number of code words. In an example implementation, bit error pattern $e_2$ may comprise a parameter that indicates a number of bit errors per code word. In another example implementation, bit error pattern $e_2$ may comprise a measure of relative randomness to burstiness of bit errors in code words. Next, at 411, access point 406 sends error pattern $e_2$ to device 402.

Next, at 412, device 402 determines if a query for bit error pattern information has been received from another device. In an example implementation, device 402 may monitor a short range interface such as Bluetooth or Wi-Fi direct to detect and receive queries for bit error pattern information from other devices operating in its vicinity. For example, other devices moving into the coverage area of access point 406 may send out these queries to attempt to gather information on access points near their location. If no query has been received the process moves to 416. At 416, access point 406 determines if it is time to update $e_2$. If it is time to update $e_2$, the process returns to 410. If it is not time to update $e_2$, the process moves to 412 where device 402 again determines if a query for bit error pattern information has been received from another device. Operations 412 and 416 are then repeated until access point 106 determines that it is time to update $e_2$ and the process moves to operation 410.

If however, at 412, it is determined by device 404 that a query for bit error pattern information has been received, the process moves to 418. At 418, device 402 may determine the device that sent the query, which in this example is device 404, and send $e_2$ to device 404 as shown in FIG. 4B at time $T_2$.

At 420, device 404 may adapt its initial transmission parameters for data transmissions to access point 406 on channel C based on $e_2$, and, at 422, as shown in FIG. 4C at time $T_3$, initiate operation on channel C1 using the transmission parameters as adapted.

In other implementations, device 402 may be located in the coverage area of multiple access points and may receive error pattern information from multiple devices, each communicating with a different access point of the multiple access points using the process of FIG. 4D. Device 402 may then select an access point of available access points based on the error pattern information received from the multiple access points. Also, in another implementation, device 402 may receive error pattern information from multiple devices, each communicating with access point 406 on a different channel using the process of FIG. 4D. Device 402 may then select a channel on which to communicate with access point 406 based on the error pattern information received from the multiple access points. In a further implementation, device 402 may be located in the coverage area of multiple access points, each capable of communicating on multiple channels, and may receive error pattern information from multiple devices, each communicating with the same access point of the multiple access points on different channels and/or with a different access point of the multiple access points using the process of FIG. 4D. Device 402 may then select an access point of available access points and a channel of the selected access point based on the error pattern information received from the multiple access points.

Figure 5:
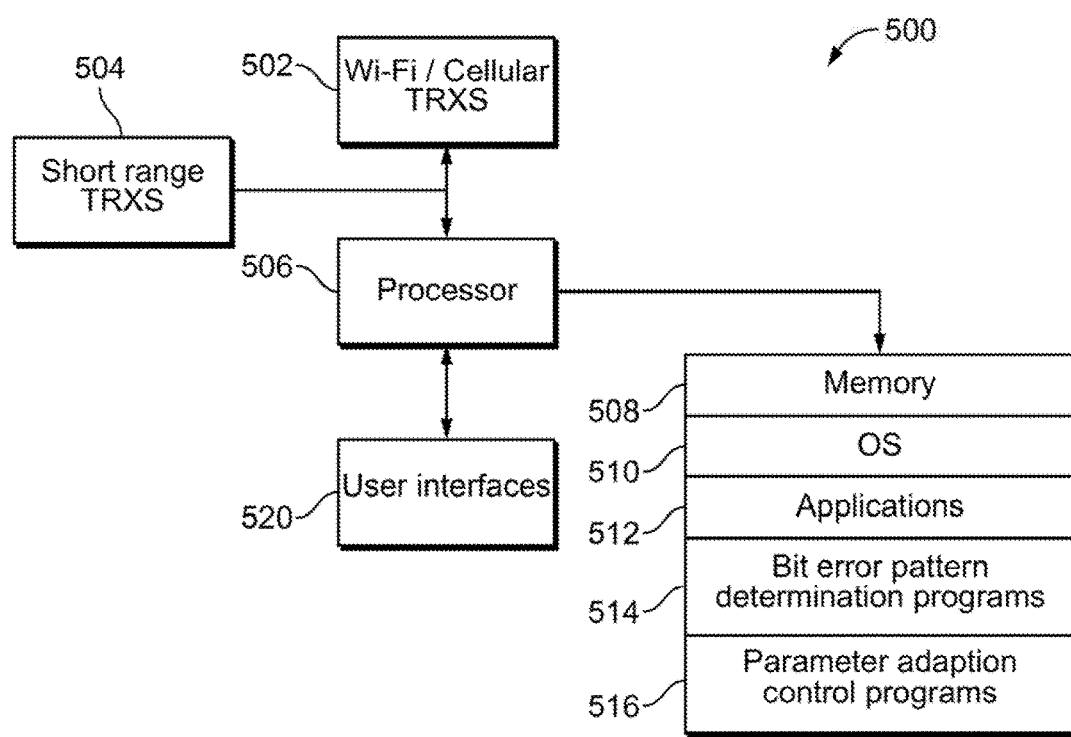

FIG. 5 is a simplified block diagram of an example device 500. The functions shown in FIG. 3A may be implemented on a device such as device 500. Device 500 may include a processor 506, memory 508, user interfaces 520, short range transceivers (TRXS) 504, and Wi-Fi/cellular transceiver (TRXS) 502. In various implementations of device 500, not all the functions shown in FIG. 5 will be needed. For example, if device 500 is implemented as an access point such as access point 304, short range TRXS 504 and user interfaces 520 may not be needed. Memory 508 may be implemented as any type of computer readable storage media, including non-volatile and volatile memory. Memory 508 is shown as including code comprising device operating system (OS) 510, device applications 512, bit error pattern determination programs 514 and parameter adaption control programs 516. Processor 506 may comprise one or more processors, or other control circuitry, or any combination of processors and control circuitry. The bit error pattern determination programs 514 may provide the functions described for bit error determination functions 311 or 319 shown in FIG. 3A. When executed, the bit error pattern determination programs 514 may cause processor 506 to control device 500 to perform processes to monitor received data and determine error patterns for the received data. The error patterns may then be collaboratively shared with other devices according to the disclosed implementations. Parameter adaption control programs 516 may provide the functions described for parameter adaption functions 305 or 315 shown in FIG. 3A. When executed, parameter adaption control programs 516 may cause processor 506 to control device 500 to receive collaboratively shared error pattern information and use the error pattern information to adapt transmission parameters based on the error pattern information according to the implementations.

In example implementations, device 500 may be any type of device that may be configured to communicate with a network or other device. For example, device 500 may be implemented in a smart phone, a tablet computer, a desktop computer, laptop computer device, gaming devices, media devices, smart televisions, multimedia cable/television boxes, smart phone accessory devices, tablet accessory devices, or personal digital assistants (PDAs). Device 500 may also comprise an access point, base station or other infrastructure equipment of a network that communicates with other devices in the network. In an implementation, device 500 may operate according to a timed division half-duplex communications standard. For example, device 500 may operate using half-duplex channels specified in the IEEE 802.11 Wi-Fi standards.

The example embodiments disclosed herein may be described in the general context of processor-executable code or instructions stored on memory that may comprise one or more computer readable storage media (e.g., tangible non-transitory computer-readable storage media such as memory 508). As should be readily understood, the terms "computer-readable storage media" or "non-transitory computer-readable media" include the media for storing of data, code and program instructions, such as memory 508, and do not include portions of the media for storing transitory propagated or modulated data communication signals.

While implementations have been disclosed and described as having functions implemented on particular wireless devices operating in a network, one or more of the described functions for the devices may be implemented on a different one of the devices than shown in the figures, or on different types of equipment operating in different systems.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any appropriate functional blocks, type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

The disclosed embodiments include a first node comprising one or more processors and memory in communication with the one or more processors, the memory comprising code that, when executed, causes the one or more processors to control the first node to receive a plurality of bit error patterns, each of the plurality of bit error patterns associated with one of a plurality of neighbor nodes, receive at least one data packet for routing, determine a next hop node from the plurality of neighbor nodes based on the plurality of bit error patterns, and route the at least one data packet to the next hop node. The plurality of bit error patterns may comprise a plurality of bit error rates and the first node may determine the next hop node based on the plurality of bit error rates. The plurality of bit error patterns may comprise a plurality of measures of relative randomness to burstiness of bit errors and the first node may determine the next hop node based on the plurality of measures of relative randomness to burstiness of bit errors. The memory may further include a plurality of error correcting capabilities, each associated with one of the plurality of neighbor nodes, the plurality of bit error patterns each may comprise a bit error rate, and the first node may determine the next hop node by determining the next hop node based on the next hop node's associated bit error rate and associated error correcting capability. The plurality of bit error patterns may comprise a plurality of bit error randomness measurements and the first node may determine the next hop node based on the plurality of bit error randomness measurements. The plurality of bit error patterns may comprise a plurality of bit error burstiness measurements and the first node may determine the next hop node based on the plurality of bit error burstiness measurements. The memory may include a plurality of error correcting capabilities, each associated with one of the plurality of neighbor nodes, the at least one data packet may comprise a first at least one data packet, the next hop node may comprise a first next hop node, the plurality of bit error patterns may comprises a first plurality of bit error patterns, and the code further causes the one or more processors to control the first node to receive a second plurality of bit error patterns, each of the second plurality of bit error patterns associated with one of the plurality of neighbor nodes, receive a second at least one data packet for routing, compare a bit error pattern of the second plurality of bit error patterns associated with the first next hop node and an error correcting capability associated with the first next hop node, and route, based on the comparison, the second at least one data packet to a second next hop node of the plurality of neighbor nodes. The first node may determine the next hop node based on the plurality of bit error patterns and a type of traffic of the at least one data packet. The code may further cause the one or more processors to control the node to determine the traffic type of the at least one data packet using deep packet inspection. The memory may further comprise a database including information associating the type of traffic of the at least one data packet to a quality of service value, and the node may determine the next hop node based on the plurality of bit error patterns and the quality of service value associated with the type of traffic of the at least one data packet.

The disclosed embodiments also include a first device comprising one or more processors and memory in communication with the one or more processors, the memory comprising code that, when executed, causes the one or more processors to control the device to receive, from a second device, a bit error pattern for data exchanged between the first device and the second device, and adapt at least one transmission parameter at the first device based on the bit error pattern. The first device may adapt the at least one transmission parameter by determining a data rate. The code may further cause the one or more processors to control the first device to determine if a threshold has been reached, and, if the threshold has been reached, adapt the at least one transmission parameter by reducing the data rate. The code may further cause the one or more processors to control the first device to determine if a threshold has been reached, and, if the threshold has been reached, adapt the at least one transmission parameter by increasing the data rate. The first device may adapt the at least one transmission parameter by determining an error correction capability. The code may further cause the one or more processors to control the first device to determine if a threshold has been reached, and, if the threshold has been reached, adapt the at least one transmission parameter by increasing the error correction capability. The bit error pattern may comprise a measure of relative randomness to burstiness of bit errors. The bit error pattern may comprise a burstiness measurement of bit errors. The bit error pattern may comprise a randomness measurement of bit errors. The first device may adapt at least one transmission parameter at the first device based on the bit error pattern and a type of the data traffic. The code may further cause the one or more processors to control the first device to determine a type of the data traffic using deep packet inspection. The memory may further comprise a database including information associating the type of the data traffic to a quality of service value, and the first device may adapt the at least one transmission parameter at the first device based on the bit error pattern and the quality of service value associated with the type of the data traffic.

The disclosed embodiments further include a first device comprising one or more processors and memory in communication with the one or more processors, the memory comprising code that, when executed, causes the one or more processors to control the node to receive a bit error pattern from a second device, the bit error pattern associated with data signals sent from the second device to a third device, and adapt at least one transmission parameter for data signals sent from the first device to the third device based on the bit error pattern. The code may cause the one or more processors to control the first device to request the bit error pattern from the second device on a short range interface. The at least one transmission parameter may comprise a bit error rate and the first device may adapt the at least one transmission parameter by setting a data rate based on the bit error rate. The at least one transmission parameter may comprise a bit error rate and the device may adapt the at least one transmission parameter by setting an error correction capability based on the bit error rate.

The disclosed embodiments also include an apparatus for managing a plurality of network nodes comprising one or more processors and memory in communication with the one or more processors, the memory comprising code that, when executed, causes the one or more processors to control the apparatus to receive node information for each of the plurality of network nodes, receive a plurality of bit error patterns, each of the plurality of bit error patterns associated with one of the plurality of network nodes, determine, based on the plurality of bit error patterns and the node information for each of the plurality of network nodes, packet data traffic routing information, and provide the information to at least one of the plurality of network nodes. The node information for each of the plurality of network nodes may comprise an error correction capability for each of the network nodes.

Although the subject matter has been described in language specific to structural features and/or methodological operations or acts, it is to be understood that the subject matter defined in the appended claims is not necessarily limited to the specific features, operations, or acts described above. Rather, the specific features, operations, and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A first node configured to operate in a network comprising a plurality of nodes configured to route a data packet from a source device to a destination device, the plurality of nodes comprising (i) a source node connected to the source device, (ii) a destination node connected to the destination device, and (iii) a plurality of intermediate nodes configured to route the data packet from the source node to the destination node, the plurality of intermediate nodes comprising the first node and a plurality of second nodes, the first node comprising:
   a processor; and
   a memory in communication with the processor, the memory comprising executable instructions that, when executed by the processor, cause the processor to control the first node to perform functions of:
   receiving a plurality of bit error patterns associated with a plurality of channels established between the first node and the plurality of second nodes, respectively;
   based on the plurality of bit error patterns, selecting one of the plurality of second nodes as a next hop node; and
   upon receiving the data packet from the source node or one of the plurality of second nodes, routing the received data packet to the second node selected as the next hop node.

2. The first node of claim 1, wherein the plurality of bit error patterns comprises a plurality of bit error rates associated with the plurality of channels, respectively.

3. The first node of claim 1, wherein the plurality of bit error patterns comprises a plurality of measures of relative randomness to burstiness of bit errors associated with the plurality of channels, respectively.

4. The first node of claim 1, wherein the instructions, when executed by the processor, further cause the processor to control the first node to perform a function of receiving a plurality of error correcting capabilities associated the plurality of second nodes, respectively, the first node selecting the next hop node further based on the plurality of error correcting capabilities.

5. The first node of claim 1, wherein the plurality of bit error patterns comprises a plurality of bit error randomness measurements associated with the plurality of channels, respectively.

6. The first node of claim 1, wherein the plurality of bit error patterns comprises a plurality of bit error burstiness measurements associated with the plurality of channels, respectively.

7. The first node of claim 1, wherein the instructions, when executed by the processor, further cause the processor to control the first node to perform a function of sending a plurality of error correcting capabilities to the plurality of second nodes, respectively,
   the data packet comprises a first data packet,
   the next hop node comprises a first next hop node,
   the plurality of bit error patterns comprises a plurality of first bit error patterns, and
   the instructions, when executed by the processor, further cause the processor to control the first node to perform functions of:
   receiving a plurality of second bit error patterns associated with the plurality of channels, respectively;
   receiving a second data packet for routing;
   comparing the second bit error pattern associated with the first next hop node and the error correcting capability associated with the first next hop node;
   selecting, based on the comparison, one of the plurality of second nodes as a second next hop node; and
   routing the second data packet to the second next hop node.

8. The first node of claim 1, wherein the instructions, when executed by the processor, further cause the processor to control the first node to perform the function of selecting the next hop node further based on a type of traffic of the data packet.

9. The first node of claim 8, wherein the instructions, when executed by the processor, further cause the processor to control the first node to perform functions of:
   performing deep packet inspection; and
   determining the type of traffic of the data packet based on the deep packet inspection.

10. The first node of claim 8, further comprising a database including information associating the type of traffic of the data packet to a quality of service value,
    wherein the instructions, when executed by the processor, further cause the processor to control the first node to perform the function of selecting the next hop node further based on the quality of service value associated with the type of traffic of the data packet.

11. A method of operating a first node in a network comprising a plurality of nodes configured to route a data packet from a source device to a destination device, the plurality of nodes comprising (i) a source node connected to the source device, (ii) a destination node connected to the destination device, and (iii) a plurality of intermediate nodes configured to route the data packet from the source node to the destination node, the plurality of intermediate nodes comprising the first node and a plurality of second nodes, the method comprising:
    receiving a plurality of bit error patterns associated with a plurality of channels established between the first node and the plurality of second nodes, respectively;
    based on the plurality of bit error patterns, selecting one of the plurality second nodes as a next hop node; and
    upon receiving the data packet from the source node or one of the plurality of second nodes, routing the received data packet to the second node selected as the next hop node.

12. The method of claim 11, wherein the plurality of bit error patterns comprises at least one of:
    a plurality of bit error rates associated with the plurality of channels, respectively;
    a plurality of measures of relative randomness to burstiness of bit errors associated with the plurality of channels, respectively;
    a plurality of bit error randomness measurements associated with the plurality of channels, respectively; and
    a plurality of bit error burstiness measurements associated with the plurality of channels, respectively.

13. The method of claim 11, further comprising receiving a plurality of error correcting capabilities associated with the plurality of second nodes, respectively,
    wherein the next hop node is selected further based on the plurality of error correcting capabilities.

14. The method of claim 13, wherein:
    the data packet comprises a first data packet,
    the next hop node comprises a first next hop node,
    the plurality of bit error patterns comprises a plurality of first bit error patterns, and
    the method further comprises:
    receiving a plurality of second bit error patterns associated with the plurality of channels, respectively;
    receiving a second data packet for routing;

comparing the second bit error pattern associated with the first next hop node and the error correcting capability associated with the first next hop node;

selecting, based on the comparison, one of the plurality of second nodes as a second next hop node; and routing the second data packet to the second next hop node.

15. The method of claim 11, further comprising selecting the next hop node further based on a type of traffic of the data packet.

16. The method of claim 15, further comprising:
performing deep packet inspection; and
determining the type of traffic of the data packet based on the deep packet inspection.

17. The method of claim 15, further comprising associating the type of the traffic of the data packet to a quality of service value, wherein the next hop node is selected further based on the quality of service value associated with the type of traffic of the data packet.

18. A non-transitory computer readable medium containing instructions, when executed by a processor, configured for causing a first node to perform functions in a network comprising a plurality of nodes configured to route a data packet from a source device to a destination device, the plurality of nodes comprising (i) a source node connected to the source device, (ii) a destination node connected to the destination device, and (iii) a plurality of intermediate nodes configured to route the data packet from the source node to the destination node, the plurality of intermediate nodes comprising the first node and a plurality of second nodes, the functions comprising:

receiving a plurality of bit error patterns associated with a plurality of channels established between the first node and the plurality of second nodes, respectively;

based on the plurality of bit error patterns, selecting one of the plurality second nodes as a next hop node; and upon receiving the data packet from the source node or one of the plurality of second nodes, routing the received data packet to the second node selected as the next hop node.

19. The non-transitory computer readable medium of claim 18, wherein the plurality of bit error patterns comprises at least one of:

a plurality of bit error rates associated with the plurality of channels, respectively;

a plurality of measures of relative randomness to burstiness of bit errors associated with the plurality of channels, respectively;

a plurality of bit error randomness measurements associated with the plurality of channels, respectively; and a plurality of bit error burstiness measurements associated with the plurality of channels, respectively.

20. The non-transitory computer readable medium of claim 18, wherein the instructions further cause the first node to perform a function of receiving a plurality of error correcting capabilities associated with the plurality of second nodes, respectively.

21. The non-transitory computer readable medium of claim 20, wherein:
the data packet comprises a first data packet,
the next hop node comprises a first next hop node,
the plurality of bit error patterns comprises a plurality of first bit error patterns, and
the instructions further cause the first node to perform functions of:
receiving a plurality of second bit error patterns associated with the plurality of channels, respectively;
receiving a second data packet for routing;
comparing the second bit error pattern associated with the first next hop node and the error correcting capability associated with the first next hop node; and
routing, based on the comparison, the second data packet to a second next hop node of the plurality of second nodes.

22. The non-transitory computer readable medium of claim 21, the instructions further cause the first node to perform a function of selecting the next hop node further based on a type of traffic of the data packet.

23. The non-transitory computer readable medium of claim 22, the instructions further cause the first node to perform functions of:
performing deep packet inspection; and
determining the type of traffic of the data packet based on the deep packet inspection.

24. The non-transitory computer readable medium of claim 22, the instructions further cause the first node to perform a function of associating the type of the traffic of the data packet to a quality of service value, wherein the next hop node is selected further based on the quality of service value associated with the type of traffic of the data packet.

25. A first node configured to operate in a network comprising a plurality of nodes configured to route a data packet from a source device to a destination device, the plurality of nodes comprising (i) a source node connected to the source device, (ii) a destination node connected to the destination device, and (iii) a plurality of intermediate nodes configured to route the data packet from the source node to the destination node, the plurality of intermediate nodes comprising the first node and a plurality of second nodes, the first node comprising:

means for receiving a plurality of bit error patterns associated with a plurality of channels established between the first node and the plurality of second nodes, respectively;

means for selecting, based on the plurality of bit error patterns, one of the plurality second nodes as a next hop node;

means for receiving the data packet from the source node or one of the plurality of second nodes; and means for routing the received data packet to the second node selected as the next hop node.

26. The first node of claim 25, wherein the plurality of bit error patterns comprises at least one of:

a plurality of bit error rates associated with the plurality of channels, respectively;

a plurality of measures of relative randomness to burstiness of bit errors associated with the plurality of channels, respectively;

a plurality of bit error randomness measurements associated with the plurality of channels, respectively; and a plurality of bit error burstiness measurements associated with the plurality of channels, respectively.

27. The method of claim 25, wherein the selecting means selects the next hope node further based on a plurality of error correcting capabilities associated with the plurality of second nodes, respectively.

28. The method of claim 25, further comprising means for selecting the next hop node further based on a type of traffic of the data packet.

* * * * *